United States Patent
Cheetancheri et al.

(10) Patent No.: US 9,489,215 B2
(45) Date of Patent: Nov. 8, 2016

(54) MANAGING AN EXPRESSION-BASED DFA CONSTRUCTION PROCESS

(71) Applicant: Dell Software Inc., Round Rock, TX (US)

(72) Inventors: Senthilkumar Gopinathan Cheetancheri, Sunnyvale, CA (US); Aleksandr Dubrovsky, San Mateo, CA (US)

(73) Assignee: Dell Software Inc., Round Rock, TX (US)

(*) Notice: Subject to any disclaimer, the term of this patent is extended or adjusted under 35 U.S.C. 154(b) by 0 days.

(21) Appl. No.: 13/957,322

(22) Filed: Aug. 1, 2013

(65) Prior Publication Data

US 2015/0039550 A1    Feb. 5, 2015

(51) Int. Cl.
  *G06F 9/44* (2006.01)
  *G06N 5/02* (2006.01)
  *G06N 5/04* (2006.01)

(52) U.S. Cl.
  CPC ............ *G06F 9/444* (2013.01); *G06N 5/025* (2013.01); *G06N 5/047* (2013.01)

(58) Field of Classification Search
  None
  See application file for complete search history.

(56) References Cited

U.S. PATENT DOCUMENTS

| | | | |
|---|---|---|---|
| 2002/0124208 A1* | 9/2002 | Beer | G06F 17/504 714/37 |
| 2004/0103378 A1* | 5/2004 | Jain | G06F 17/504 716/103 |
| 2006/0047680 A1* | 3/2006 | Paruthi | G06F 17/30958 |
| 2006/0085389 A1* | 4/2006 | Flanagan et al. | 707/2 |
| 2008/0270836 A1* | 10/2008 | Kallakuri et al. | 714/37 |
| 2011/0153641 A1* | 6/2011 | Thorup | G06F 7/02 707/769 |
| 2011/0161898 A1* | 6/2011 | Chauhdry et al. | 716/103 |
| 2011/0246962 A1* | 10/2011 | Meijer et al. | 717/106 |
| 2011/0258210 A1* | 10/2011 | Agarwal et al. | 707/758 |
| 2012/0192163 A1* | 7/2012 | Glendenning et al. | 717/143 |
| 2012/0192165 A1* | 7/2012 | Xu et al. | 717/149 |
| 2015/0040142 A1 | 2/2015 | Cheetancheri | |

OTHER PUBLICATIONS

IEEE 100 The Authoritative Dictionary of IEEE Standards Terms, 7th Edition, 2000, 5 pages.*
Antimirov, Valentin "Partial derivatives of regular expressions and finite automation constructions" Theoretical Computer Science 155 1996 [Online] Downloaded Jul. 6, 2015 http://ac.els-cdn.com/0304397595001824/1-s2.0304397595001824-main.pdf?_tid=e3b29ba2-23ee-11e5-8125-00000aab0f02&acdnat=1436194649_6192963db7b6f5fa2ea2b601ee58747e.

(Continued)

*Primary Examiner* — Kakali Chaki
*Assistant Examiner* — Mai T Tran
(74) *Attorney, Agent, or Firm* — Polsinelli LLP

(57) ABSTRACT

DFA construction may be aborted if the DFA will become too big for the computing device to handle or based on user preferences. A DFA may be constructed from an NFA, which is constructed from an expression. The expression may have a total number of operands and operators r. The determination to abort DFA construction may be based on the operands. If the number of DFA nodes constructed is more than a lower threshold and the number of DFA nodes constructed is greater than a function, f(r), the DFA construction may be aborted. If the number of DFA nodes is greater than a higher threshold, the DFA construction may be aborted. The lower threshold may be determined based on computing device capabilities and user preference. The higher threshold may be based on computing device capabilities.

12 Claims, 5 Drawing Sheets

(56) References Cited

OTHER PUBLICATIONS

Goyvaerts, Jan "Syntax References for Specific Regex Flavors" 2004 Verified by wayback machine [Online] Downloaded Jul. 6, 2015 http://web.archive.org/web/20040610081508/http://www.regular-expressions.info/refext.html.

Lunteren, Jan van and Alexis Guanella "Hardware-Accelerated Regular Expression Matching at Multiple Tens of GB/S" IEEE 2012 [Online] Downloaded Jul. 6, 2015 http://ieeexplore.ieee.org/stamp/stamp.jsp?tp=&arnumber=6195546.

U.S. Appl. No. 13/957,319 Office Action mailed Jul. 28, 2015.

U.S. Appl. No. 13/957,319 Final Office Action mailed Feb. 22, 2016.

\* cited by examiner

[ a b c ]

MANAGING AN EXPRESSION-BASED DFA CONSTRUCTION PROCESS

BACKGROUND OF THE INVENTION

A deterministic finite automaton (DFA) or deterministic finite state machine is a set of states tied together by a set of transitions. The transitions may specify movement from one state to another based on some input. A DFA at a given state and for a given input has only one transition to a next state. Examples of such deterministic finite automaton may be designed in hardware or software to produce results based on the state and any input. Some applications for a DFA involve electronic systems, such as network equipment and computer operated systems.

A DFA may be constructed from a non-deterministic finite automaton (NFA), which may be constructed from a regular expression. Construction of a DFA can be expensive in terms of time and computing resources. For longer expressions, construction of a DFA can take extended periods of time and require all resources of a machine, thereby affecting performance of the machine.

There is a need in the art for improved methods of constructing DFAs which won't tie up an undesirable amount of computer time and computing resources.

SUMMARY OF THE CLAIMED INVENTION

The present system initiates construction of a DFA but aborts the construction if it is determined the DFA will eventually become too big for the computing device to handle or based on user preferences. A DFA may be constructed from an NFA, which be constructed from a regular expression. The expression may have a total number of operands and operators r. The determination to abort DFA construction may be based on the operands. If the number of DFA nodes constructed is more than a lower threshold and the number of DFA nodes constructed is greater than a function f(r), the DFA construction may be aborted. If the number of DFA nodes is greater than a higher threshold, the DFA construction may be aborted. The lower threshold may be determined based on computing device capabilities and user preference, such as the minimum time a user is willing to wait for the DFA construction to complete. The higher threshold may be based on computing device capabilities as well, and may represent the maximum memory or CPU, or both, that should be allocated to the DFA construction.

In an embodiment, a method for pattern analysis may begin with initiating construction of a deterministic finite automaton (DFA) from an expression by an application. The application may be stored in memory and executed by a processor of a computing device. Construction of the DFA may be aborted based at least on operands in the expression.

A system for monitoring a business transaction may include a computing device having a first application, a processor and a memory. The processor may be within the computing device and the memory may be within the computing device. The application may be stored in the memory and executed by the processor to receive an expression, construct a non-deterministic finite automaton (NFA) from the expression, initiate construction of a determinate finite automaton (DFA) from the NFA, and abort construction of the DFA based at least on operands in the expression.

DETAILED DESCRIPTION

The present technology initiates construction of a DFA but aborts the construction if it is determined the DFA will become too big for the computing device to handle or based on user preferences. A DFA may be constructed from an NFA, which is constructed from a regular expression. The expression may have a total number of operands and operators r. The determination to abort DFA construction may be based on the operands. For example, if the number of DFA nodes constructed is more than a lower threshold and the number of DFA nodes constructed is greater than $r^2$, the DFA construction may be aborted. If the number of DFA nodes is greater than a higher threshold, the DFA construction may be aborted. The lower threshold may be determined based on computing device capabilities and user preference, such as such as the minimum time a user is willing to wait for the DFA construction to complete. The higher threshold may be based on computing device capabilities as well, and may represent the maximum memory or CPU, or both, that should be allocated to the DFA construction.

Aborting DFA construction based on operands and/or operators is advantageous to systems that abort DFA construction based on CPU, memory, or time alone. When the determination to abort is based on a single feature, such as for example memory, the processor capability of the computing device may be completely used up by the DFA construction. Similarly, if DFA construction is aborted merely based on time, all memory of the computing device may be used up by the construction process.

Figure 1:
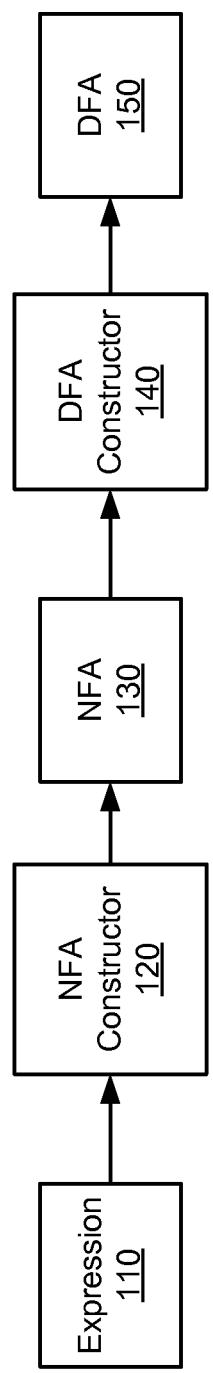
FIG. 1 is a block diagram illustrating the construction of a DFA from an expression.

FIG. 1 is a block diagram illustrating the construction of a deterministic finite automaton (DFA) from an expression. An expression 110 such as a primitive regular expression may be accessed by a non-determinate finite automaton (NFA) constructor 120 to create an NFA. For the given expression, the representative NFA may contain 2 r nodes, where r is the total number of operands and operators in the expression. An operand specifies what data is to be manipulated within the expression and an operator specifies a function to perform using the operand. The time taken to construct an NFA can be represented by O(r).

Figures 2A, 2B:
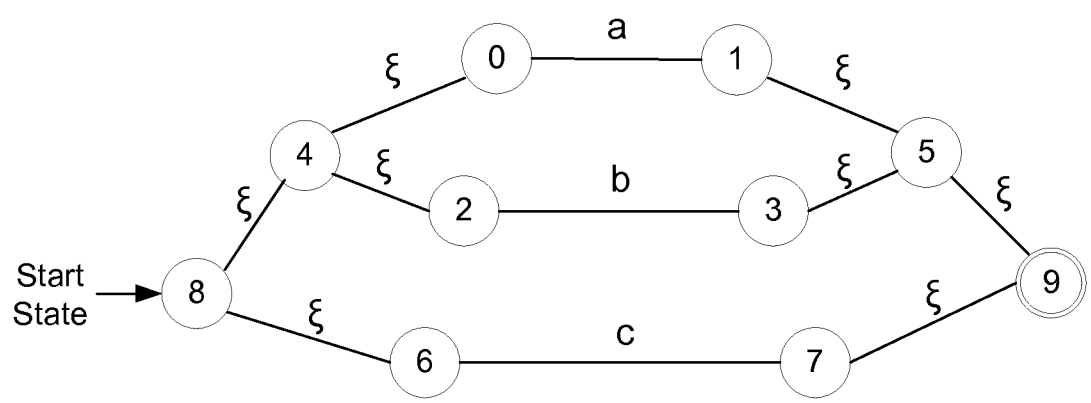
FIG. 2A illustrates an expression.
FIG. 2B illustrates an NFA for the expression of FIG. 2A.

FIG. 2A illustrates an expression. The expression of FIG. 2A reads "[abc]", which may also be expressed as the equivalent expression "a|b|c". The expression of FIG. 2A has three operands, a, b and c, and two operators—the "|" between each operand. The three operands and two operators can be combined, resulting in a value of five for r. FIG. 2B illustrates an NFA for the expression of FIG. 2A. As shown, the NFA for the expression of FIG. 2A has ten nodes, or 2 r nodes.

DFA constructor 140 may construct DFA 150 from NFA 130. The time to construct the DFA is proportional to $r^2$, and the number of states, s, in the eventually constructed DFA, and may be determined as $O(r^2 \cdot s)$. The size s of a DFA is typically r. In some cases, however, a DFA may become exceptionally large for certain degenerate regular expressions. For example, the regular expression (a|b)*a (a|b){n−1} may generate a DFA having at least $2^n$ states. Thus, the size of the DFA, s, for such an expression would be $2^r$.

To summarize, the time to generate a DFA may vary. In common cases where the number of states s is about the same as r, the DFA construction may take about $O(r^3)$. In cases of degenerative expressions, the time may take $O(r^2 \cdot 2^r)$.

Figure 3:
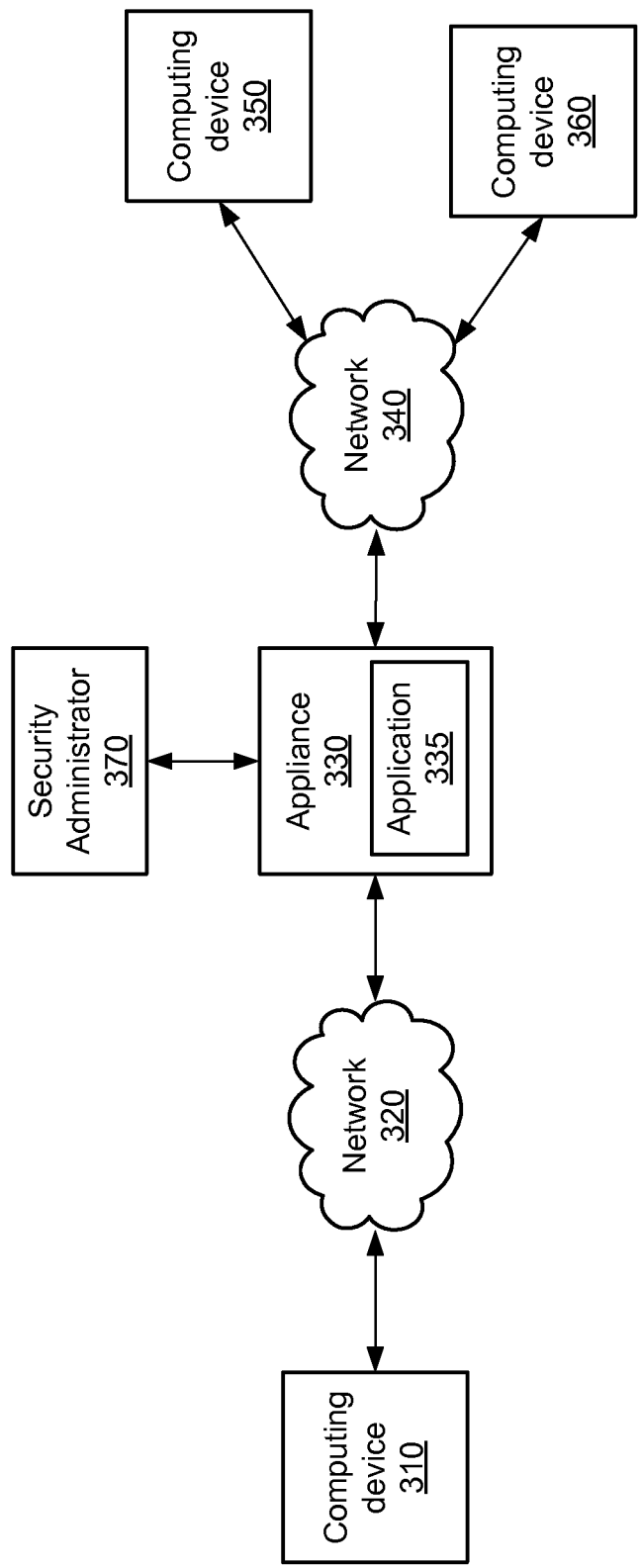
FIG. 3 is a system for utilizing a DFA in pattern analysis.

The NFA engine and DFA engine may be implemented as one or more applications, for example for use in pattern analysis. FIG. 3 is a system for utilizing a DFA in pattern analysis. The system of FIG. 3 includes computing devices 310, 350 and 360, networks 320 and 340, and appliance 330. Computing device 310 may communicate with appliance 330 over network 320. Network 320 may be implemented as one or more private networks, public networks, the Internet, an intranet, a WAN, a LAN, a WiFi network, a cellular network, or a combination of one or more of these networks.

Appliance 330 may communicate with computing devices 310, 350 and 360 over networks 320 and 340, respectively. Appliance 330 may include application 335 which may implement one or more NFA engines and DFA engines. An expression may be received by appliance 330 from the appliance administrator 300. Application 335 may receive the expression, construct an NFA from the expression, and begin constructing a DFA from the NFA. The construction of the DFA may be aborted if it is determined the DFA would get too large to process effectively. This is discussed in more detail below.

In embodiments, the system of FIG. 3 may include a security module 370. Security module 370 may have access to one or more registered regular expressions that may be compared to the data received in traffic. The stored expressions may represent undesirable script, malware or other code. When a match occurs, the security administration module 370 may provide an alert to a user via email, SMS, or other communication method.

Figure 4:
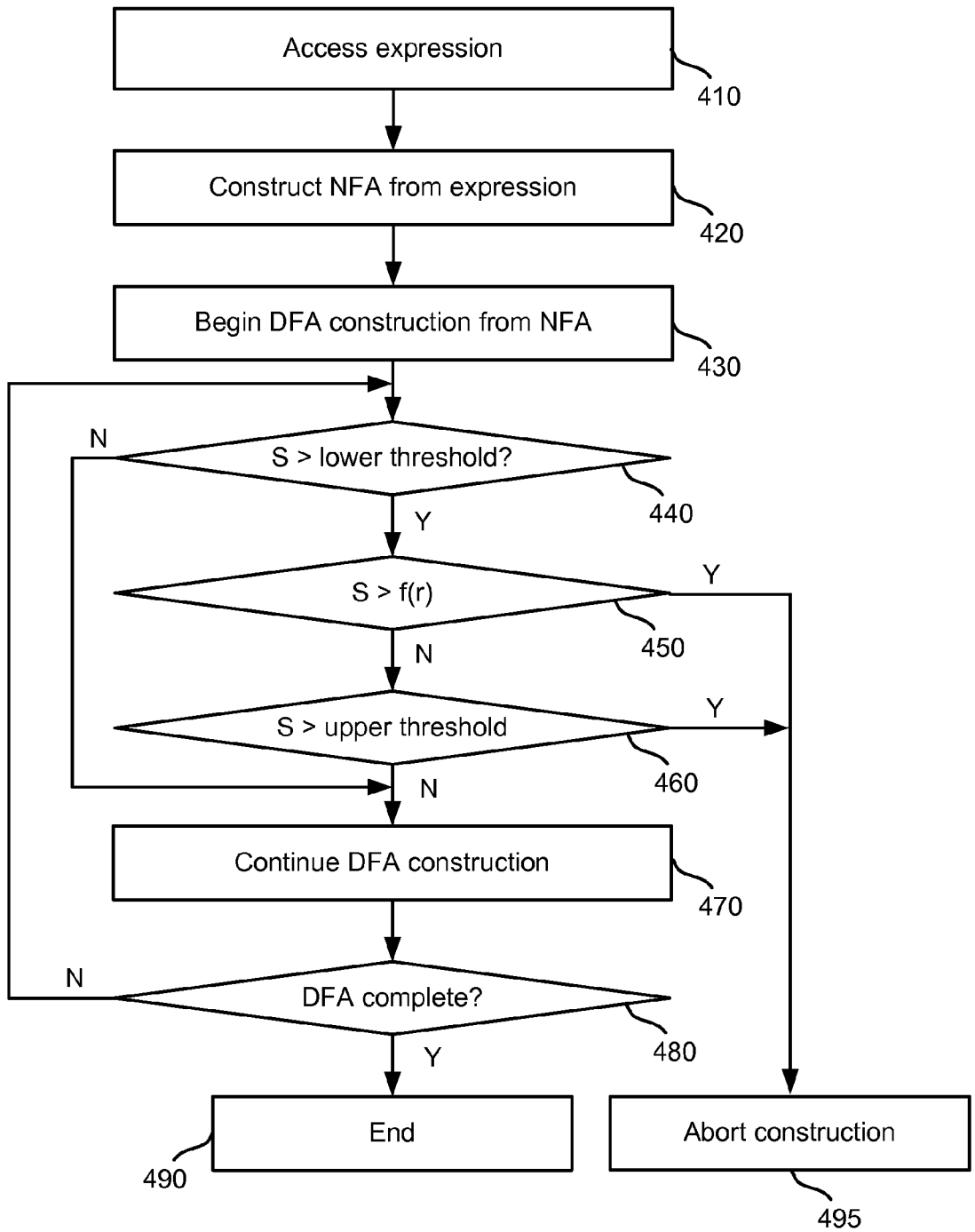
FIG. 4 illustrates a method for construction of a DFA from an expression.

FIG. 4 illustrates a method for construction of a DFA from an expression. The method of FIG. 4 may be performed by one or more machines and applications that process one or more of an expression, an NFA and a DFA. The method of FIG. 4 may be implemented by appliance 330 of FIG. 3.

First, an expression may be accessed at step 410. The expression may be a regular expression. The expression may be a common expression or a degenerative expression, corresponding to a DFA construction time of $O(r^3)$ or $O(r^2 \cdot 2^r)$, respectively.

An NFA is constructed from the expression at step 420. The NFA may be constructed by an NFA constructor. The time to construct the NFA is proportional to the number of operands and operators r, such that the longer the expression the longer it would take to construct the NFA.

DFA construction begins at step 430. The time to construct the DFA may depend on the expression. To prevent a DFA from being constructed which is too big to construct by a computing device (e.g., appliance 330), the construction may be aborted based on whether certain conditions are met. The conditions are evaluated in steps 440-460.

A determination is made at step 440 as to whether the size of the DFA is greater than a lower threshold. The lower threshold may be determined based on the capabilities of the machine generating the DFA and user preference. For example, the machine generating the DFA may have certain CPU resources and memory resources which affect how a DFA can be constructed. An exemplary computing device or appliance with a single core 500 MHz CPU and 128 MB RAM may dedicate a minimum of 5 MB for the DFA. If each DFA node takes up 1 KB of memory, then the lower threshold for the exemplary computing device may be about 5,000 nodes. In any case, the determination to abort may be a function of the number of operands, operators or both operands and operators.

The lower threshold may also be based on user preference. For example, a user may prefer not to wait more than thirty seconds for the DFA construction to complete. In this example, the number of DFA nodes that can be constructed in thirty seconds by the given machine may be taken into account when setting the lower threshold.

If the size of the DFA is not currently greater than the lower threshold, the method of FIG. 4 continues to step 470.

If the size of the DFA is greater than the lower threshold, a determination is made as to whether the number of nodes in the DFA is greater than a function, f(r), at step 450. If both the size of the DFA is currently greater than the lower threshold and greater than f(r), the construction of the DFA is aborted at step 495. The abortion of the DFA construction helps to prevent too much time, CPU resources, memory, or all of the above from being used in constructing the DFA. If allowed to continue, the DFA construction may take up to $O(r^2 \cdot 2^r)$ time which may be unacceptable to the user, or may even exhaust the appliance resources without completing the construction If the number of nodes in the DFA is not greater than f(r) at step 450, a determination is made as to whether the number of nodes in the DFA is greater than an upper threshold at step 470. The upper threshold may be set as a function of the capabilities of the computing device constructing the DFA. For an exemplary computing device or appliance with a single core 500 MHz CPU and 128 MB RAM, the upper threshold may be set at 20 MB, which would correspond to about 20,000 nodes if each DFA node takes up 1 KB of memory. If the number of nodes s is greater than an upper threshold, the DFA construction is aborted at step 495. If the number of nodes s is not greater than the upper threshold at step 460, DFA construction may continue at step 470.

A determination is made as to whether DFA construction is complete at step 480. If DFA construction is complete, the method ends at step 490. If DFA construction is not complete, the method returns to step 440.

Figure 5:
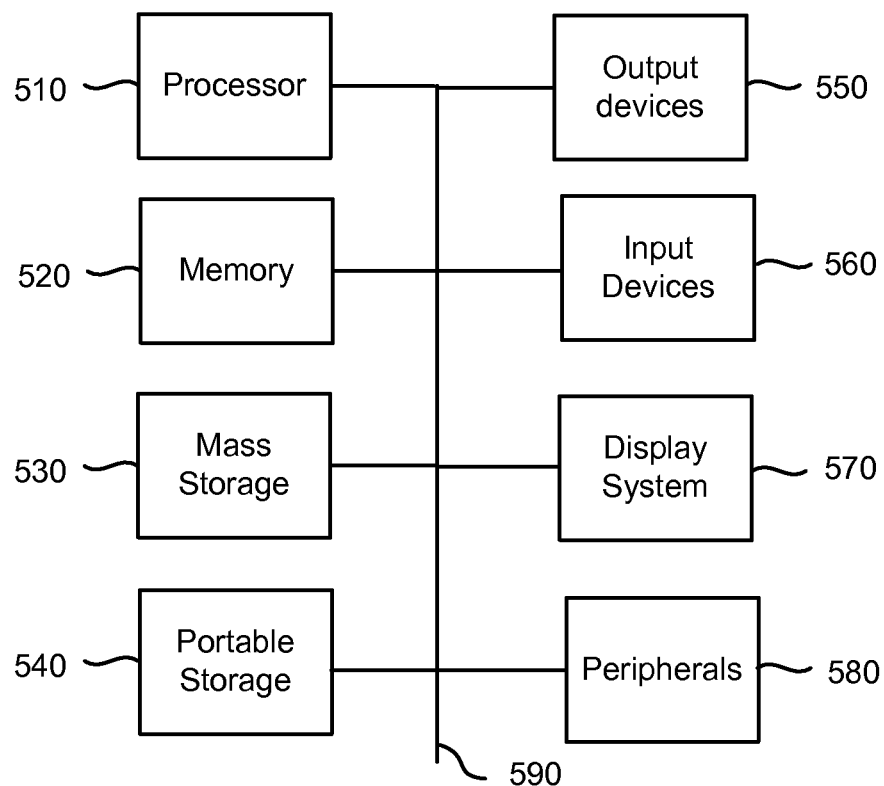
FIG. 5 is a block diagram of an exemplary system for implementing a computing device.

FIG. 5 is a block diagram of an exemplary system for implementing a computing device that may be used to implement a computing device for use with the present technology. System 500 of FIG. 5 may be implemented in the contexts of the likes of computing devices 310, 350 and 360 and appliance 330. The computing system 500 of FIG. 5 includes one or more processors 510 and memory 510. Main memory 510 stores, in part, instructions and data for execution by processor 510. Main memory 510 can store the executable code when in operation. The system 500 of FIG. 5 further includes a mass storage device 530, portable storage medium drive(s) 540, output devices 550, user input devices 560, a graphics display 570, and peripheral devices 580.

The components shown in FIG. 5 are depicted as being connected via a single bus 590. However, the components may be connected through one or more data transport means. For example, processor unit 510 and main memory 510 may be connected via a local microprocessor bus, and the mass storage device 530, peripheral device(s) 580, portable storage device 540, and display system 570 may be connected via one or more input/output (I/O) buses.

Mass storage device 530, which may be implemented with a magnetic disk drive or an optical disk drive, is a non-volatile storage device for storing data and instructions for use by processor unit 510. Mass storage device 530 can store the system software for implementing embodiments of the present invention for purposes of loading that software into main memory 510.

Portable storage device 540 operates in conjunction with a portable non-volatile storage medium, such as a floppy disk, compact disk or Digital video disc, to input and output data and code to and from the computer system 500 of FIG. 5. The system software for implementing embodiments of the present invention may be stored on such a portable medium and input to the computer system 500 via the portable storage device 540.

Input devices 560 provide a portion of a user interface. Input devices 560 may include an alpha-numeric keypad, such as a keyboard, for inputting alpha-numeric and other information, or a pointing device, such as a mouse, a trackball, stylus, or cursor direction keys. Additionally, the system 500 as shown in FIG. 5 includes output devices 550. Examples of suitable output devices include speakers, printers, network interfaces, and monitors.

Display system 570 may include a liquid crystal display (LCD) or other suitable display device. Display system 570 receives textual and graphical information, and processes the information for output to the display device.

Peripherals 580 may include any type of computer support device to add additional functionality to the computer system. For example, peripheral device(s) 580 may include a modem or a router.

The components contained in the computer system 500 of FIG. 5 are those typically found in computer systems that may be suitable for use with embodiments of the present invention and are intended to represent a broad category of such computer components that are well known in the art. Thus, the computer system 500 of FIG. 5 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. A method for optimizing pattern analysis, the method comprising:
   constructing a non-deterministic finite automaton (NFA) from a regular expression;
   initiating construction of a deterministic finite automaton (DFA) from the NFA by an application stored in a memory and executed by a processor of a computing device, wherein initiating construction of the DFA includes identifying a quantity of DFA nodes of the DFA;
   identifying a total quantity of operands and operators present in the regular expression;
   calculating the square of the identified total quantity of operands and operators of the regular expression; and
   aborting construction of the DFA based at least partially on a determination that the identified quantity of DFA nodes of the DFA is greater than the calculated square of the identified total quantity of operands and operators in the regular expression.

2. The method of claim 1, wherein construction of the DFA is aborted based also in part on a determination that the identified quantity of DFA nodes in the DFA is greater than a predetermined lower threshold.

3. The method of claim 1, wherein construction of the DFA is aborted based at least partially on usage of the memory, the processor, or some combination thereof.

4. The method of claim 1, wherein construction of the DFA is aborted based at least partially on a time waiting for the construction of the DFA to complete.

5. A non-transitory computer-readable storage medium having embodied thereon a program, the program being executable by a processor to perform a method for optimizing pattern analysis, the method comprising:
   constructing a non-deterministic finite automaton (NFA) from a regular expression;
   initiating construction of a deterministic finite automaton (DFA) from the NFA, wherein initiating construction of the DFA includes identifying a quantity of DFA nodes of the DFA;
   identifying a total quantity of operands and operators present in the regular expression;
   calculating a square of the identified total quantity of operands and operators of the regular expression; and
   aborting construction of the DFA based at least partially on a determination that the identified quantity of DFA nodes of the DFA is greater than the calculated square of the identified total quantity of operands and operators in the regular expression.

6. The non-transitory computer-readable storage medium of claim 5, wherein construction of the DFA is aborted based at least in part on identifying that the identified quantity of DFA nodes in the DFA is greater than a predetermined lower threshold.

7. The non-transitory computer-readable storage medium of claim 5, wherein construction of the DFA is aborted based at least partially on usage of a memory, a processor, or some combination thereof.

8. The non-transitory computer-readable storage medium of claim 5, wherein construction of the DFA is aborted based at least partially on a time waiting for the construction of the DFA to complete.

9. A system for optimizing pattern analysis, the system comprising:
   a processor; and
   a memory coupled to the processor, wherein execution of instructions stored in the memory by the processor:
      constructs a non-deterministic finite automaton (NFA) from a regular expression,
      initiates construction of a deterministic finite automaton (DFA) from the NFA, wherein initiating construction of the DFA includes identifying a quantity of DFA nodes of the DFA,
      identifies a total quantity of operands and operators present in the regular expression,
      calculates a square of the identified total quantity of operands and operators of the regular expression, and aborts construction of the DFA based at least partially on a determination that the identified quantity of DFA nodes of the DFA is greater than the calculated square of the identified total quantity of operands and operators in the regular expression.

10. The system of claim 9, wherein aborting construction of the DFA is further based at least partially on usage of the memory, the processor, or some combination thereof.

11. The system of claim 9, wherein aborting construction of the DFA is further based at least partially on a time waiting for the construction of the DFA to complete.

12. The system of claim 9, wherein construction of the DFA is aborted based at least in part on identifying that the identified quantity of DFA nodes in the DFA is greater than a predetermined lower threshold.

* * * * *